Patented May 22, 1945

2,376,369

UNITED STATES PATENT OFFICE 2,376,369

METHOD OF REACTING TERPENES

Donald A. Lister, Brunswick, Ga., assignor to Hercules Powder Company, Wilmington, Del., a corporation of Delaware No Drawing. Application February 25, 1944, Serial No. 523,917

15 Claims. (Cl. 260—631.5)

This invention relates to preparation of water-soluble terpene alcohols and other products derived from unsaturated terpenes by treatment with oxygen.

In my pending application, Serial No. 484,481, entitled "Oxidation-hydration of terpinolene to water-soluble terpene alcohols," there is described a method of preparing polyhydroxy terpene compounds including water-soluble compounds by the reaction of terpinolene with water in the presence of an oxygen-containing gas. However, terpinolene is of limited availability and represents merely a fraction of the naturally occurring terpenes available.

It is, therefore, an object of this invention to prepare polyhydroxy terpene compounds including water-soluble compounds and water-insoluble compounds of this nature from materials of wider availability than terpinolene. Other and further objects will appear hereinafter.

In accordance with this invention, terpene polyhydroxy compounds are prepared by subjecting an unsaturated terpene in liquid phase to reaction with water and with a gas or other fluid containing free oxygen, in the presence of a terpinolene-water-oxygen reaction product as a catalyst until a freely water-soluble terpene product is produced or until a substantial increase in hydroxyl content is obtained. The reaction may be carried out at ordinary atmospheric pressure or it may be carried out under superatmospheric pressure of the gas containing free oxygen if desired. Auxiliary catalysts may be utilized with the terpinolene-water-oxygen reaction product to facilitate the reaction.

The terpene utilized in the method according to this invention will be an unsaturated terpene which may be of a substituted or unsubstituted nature. Thus, the term "terpene," as used herein and in the claims, is used in its broader sense, and includes both terpene hydrocarbons and derivatives thereof, which may be considered as terpene hydrocarbons which have been modified by substitution or addition thereto of elements or groups containing elements, such as oxygen, sulfur, nitrogen, halogens, and so forth. Unsaturated monocyclic terpenes of the alcohol type, such as alpha-terpineol, beta-terpineol, gamma-terpineol, the terpinenols, and the like, are most readily reacted by the method in accordance with this invention. However, the method may be applied to other unsaturated terpenes, such as, for example, dipentene, terpinene, myrcene, phellandrene, alpha-pyronene, beta-pyronene, alpha-terpinyl acetate, alpha-terpinyl formate, beta-terpinyl formate, terpineol formate, terpinyl methyl ether, terpinyl mercaptan, terpinyl amine, terpinyl glycol ether, alpha-pinene, beta-pinene, allo-ocimene, fenchene, and unsaturated sesquiterpenes and polyterpenes. Mixtures of terpenes and commercial terpene cuts, such as gum turpentine, wood turpentine, and especially pine oil, and the like, may be utilized.

The oxygen utilized in the reaction according to this invention may be provided in the form of any gas containing free oxygen. Pure oxygen may be utilized, if desired. However, oxygen is most conveniently provided in the ordinary atmospheric form.

The catalyst utilized is a product obtained by the method described in my hereinabove-mentioned application, Serial No. 484,481. This product is obtained by reacting a terpene hydrocarbon or hydrocarbon cut boiling within the range of about 180° C.–195° C., having a specific gravity within the range of about 0.863 and about 0.873, and which is believed to be terpinolene with water in the presence of an oxygen-containing gas, such as air, for example, at a temperature within the range of about 0° C. and about 90° C., preferably between about 30° C. and about 60° C., for a period between about one and about six days until a product freely soluble in water is obtained. A terpene cut rich in the terpene hydrocarbon having the properties described may, of course, be utilized, but preferably a fraction believed to consist almost entirely of terpinolene having the more narrow boiling range of about 185° C. to about 191° C. and a specific gravity of 0.865–0.870 will be utilized. For example, 280 parts of a terpinolene cut obtained in the purification of crude wood turpentine and having a boiling range of 187° C.–189° C. is agitated with 252 parts by volume of water for 96 hours at room temperature, a stream of air being bubbled through the reacting mixture. The terpinolene-oxygen-water reaction product may be obtained in a shorter period of reaction by the use of oxygen at superatmospheric pressure. With this expedient, the terpinolene-water-oxygen reaction product may be obtained in from three to 24 hours of reaction. The resulting aqueous phase contains a terpinolene-water-oxygen reaction product in solution, and this product may be utilized in solution in the water phase as obtained or it may be recovered from the water phase by vacuum distillation of the water at low temperatures. The distillate obtained by vacuum distillation of the water phase has been found to have a valuable catalytic effect in shortening the period of time required for many terpenes to start taking up oxygen after they have been exposed to treatment with oxygen and water. Thus, the whole product obtained by treatment of terpinolene with oxygen, or the aqueous phase, or a fraction of the aqueous phase may be utilized as a catalyst in treatment of a terpene with water and oxygen.

Alternatively, the terpinolene-water oxygen reaction product utilized as the catalyst may be prepared in situ in the reaction mixture in which the particular terpene being reacted upon is treated with water and oxygen. It has been found that the rate of reaction of terpinolene with water and oxygen is very much greater than the reaction rate of other terpenes. Thus, when a mixture of an unsaturated terpene of the character hereinabove described with terpinolene is subjected to reaction with water and with free oxygen, the terpinolene-water-oxygen reaction product is formed in the reaction mixture and thereafter serves as a catalyst to induce a similar reaction of other terpenes present. It is, therefore, within the scope of this invention to produce freely water-soluble polyhydroxy terpene compounds by subjecting a mixture of an unsaturated terpene and terpinolene to reaction with water and oxygen until a freely water-soluble polyhydroxy terpene compound is produced in appreciable quantities.

The reaction in accordance with this invention is brought about by mixing the terpene and the terpinolene or terpinolene-water-oxygen reaction product and bringing this mixture into intimate contact with water and with oxygen. This may be accomplished by vigorous agitation of the liquid reactants to provide a constant renewal of terpenes exposed to the oxygen. Preferably, air or oxygen is whipped up with, or bubbled through, the liquid reactant. The reaction may be facilitated by providing the oxygen under superatmospheric pressure. Thus, air at any convenient pressure up to several thousand atmospheres may supply the oxygen needed, the reaction greatly increasing as the pressure is increased. For ordinary purposes, air pressures of 10 to 100 atmospheres are preferred.

The reaction may be conducted at any temperature in the range between about 0° C. and about 100° C., and preferably the temperature will be maintained between about 30° C. and about 60° C. The ratio of water to the terpene reacted upon is not critical, but, in general, the water will be utilized in a quantity between about one-fifth and about five times by weight of the terpene, and preferably in amount about equal to the terpene. The terpinolene-water-oxygen reaction product utilized as the catalyst or the terpinolene from which the catalyst is formed in situ will be in a quantity between about 2% and about 25%, and preferably between about 3% and 10% by weight of the terpene reacted upon.

The reaction is in some cases facilitated by the presence of catalysts in addition to terpinolene-water-oxygen reaction product and used in addition thereto. For example, traces of hydrogen sulfide and other hydrosulfides promote the activity of the terpinolene reaction product catalyst. Hydrohalides of basic nitrogen compounds, for example, ammonium chloride, ammonium bromide, pyridine hydrochloride, aniline hydrochloride, etc.; solids with active surfaces, such as activated charcoal, activated alumina, silica gel, etc.; and compounds of elements which readily change valence, such as lead naphthenate, cobalt linoleate, manganese resinate, potassium permanganate, vanadium sulfate, ethyl mercaptan, etc., have similar action. Where an additional catalyst is an oxidizing agent, it will be used in a quantity sufficiently small to insure that it will not oxidize appreciable terpene.

The time of reaction according to the method of this invention varies considerably with the conditions of reaction utilized and the particular terpene reacted upon. The conditions of oxygen contact determine to a considerable extent the minimum time of reaction to obtain a highly hydroxylated product. Where the liquid reactants are merely agitated in air or where air is slowly bubbled through a large mass of liquid reactants, reaction time will usually be very long; i. e., from about 24 hours to in excess of three weeks. Under pressure; i. e., at high oxygen pressures, the reaction will in most cases be substantially completed in from about five to about 48 hours.

The reaction in accordance with this invention will usually be conducted until substantially no more oxygen is absorbed by the reaction mixture. However, for some purposes a maximum yield of water-soluble products is not desired. Thus, the reaction may be carried out only until a substantial increase in hydroxyl content is obtained; i. e., an increment in hydroxyls equivalent to the formation of 20% of terpene alcohols calculated on the monohydric basis. Reaction to this extent is in most cases accompanied by formation of water-soluble terpene derivatives.

The products obtained, for example, from an unsaturated monocyclic or acyclic hydrocarbon, comprise highly hydroxylated compounds which are freely water-soluble and somewhat less hydroxylated compounds slightly or partially soluble in water. The products are characterized by the presence of a substantial content of both tertiary and secondary hydroxyl groups. The water-soluble reaction products may be recovered by separating the aqueous phase of the reaction mixture from the oily phase, and removing water from the aqueous phase by vacuum distillation to leave a syrupy residue. The distillation step is preferably carried out at the lowest possible temperature, say between about 40° C. and about 90° C. The syrupy residue obtained will at least partially crystallize, in some cases, on cooling and prolonged standing to yield a white crystalline product and a viscous syrupy mother liquor, both of which are freely soluble in water. The yields of water-soluble product are, in most cases, relatively low and will, in general, range from about 4% to about 20% by weight of the terpene reacted upon. The water-insoluble phase is composed of products less hydroxylated than the water-soluble products and may contain unreacted terpenes. However, it will be characterized by an increase in hydroxyl content over the material started with; i. e., at least a 10% increase in hydroxyl.

The water-soluble phase may be recovered for separate use with or without elimination of water or further fractionation. The syrup is a glycerol substitute and is useful in coupling water-soluble and water-immiscible materials. The water-insoluble phase may also be recovered separately and may be used as a detergent or flotation aid. The whole product may be left as a mixture and so recovered and used. When water is removed by vacuum distillation, the water-soluble and water-insoluble products for the most part merge to form a homogeneous product useful in flotation, of improved value as an antiskinning agent in enamels, and of value as a solvent for resins. Hence, recovery of a combined product, characterized by increased hydroxyl content over the material started with, is frequently desirable.

The crystalline and liquid water-soluble products are believed to be mixtures of tertiary polyhydroxy terpene alcohols which may also contain a secondary hydroxyl and such alcohol, one hydroxyl group of which is esterified with formic acid. When using an unsaturated monocyclic terpene hydrocarbon or alcohol as the terpene being reacted upon, the crystalline product is believed to be a trihydroxy terpene compound with one double bond or mixture of such products. In the case of unsaturated acyclic terpenes, the products are believed to contain tetrahydroxy unsaturated alcohols, some of which may appear in crystalline form. When a substituted terpene hydrocarbon is reacted, the substituent is believed to carry through into the products.

Water-insoluble hydroxylated products may be recovered from the oily layer by removal of any unreacted terpenes by vacuum evaporation or vacuum steam distillation. These oily products are in part polymerized and at the same time higher in oxygen content than the starting materials. In some cases, compounds with a hydroxyl and a carbonyl group are believed to be present; i. e., hydroxy esters and/or hydroxy-ketones.

The manner in which the terpinolene or terpinolene oxidation product functions is not known beyond that it reduces the time required for appreciable oxidation to take place, and that in the case of unsaturated terpene alcohols, it permits more extensive oxidation to occur. It is possible it forms intermediate oxygenated compounds which in turn transfer oxygen to another unsaturated terpene. However, the free oxygen and water are substantially the sole sources of oxygen added to the product whether directly or through the medium of a terpinolene intermediate.

The terpinolene or terpinolene product is also effective in water-oxygen treatment of terpenes in the presence of ammonia to give hydroxyamino derivatives, or in the presence of alcohols to give hydroxy ether derivatives, or in the presence of carboxylic acids to give hydroxy ester derivatives.

The examples following illustrate, by specific embodiments thereof, the method in accordance with this invention and the products obtained thereby. Unless otherwise specified, all parts and percentages are by weight.

*Example 1*

A mixture consisting of 3000 grams of crystalline alphaterpineol and 335 grams of a terpinolene cut containing about two-thirds terpinolene and about one-third terpinene was agitated with 3000 grams of water for a period of ten days, the agitation being sufficiently vigorous to bring about occlusion of air in the mixture. At the end of this period a water-soluble terpene polyhydric alcohol was recovered from the reaction mixture by separating the water layer and evaporating the water therefrom under vacuum at a temperature of about 60° C. to recover a syrupy liquid. The oily layer yielded hydroxy water-insoluble compounds upon vacuum fractionation.

The nature of the change in the material being reacted upon is illustrated by the following data for the reaction mixture at the beginning and end of the reaction period:

| Properties | Original reaction mixture of terpineol and terpinolene cut | Reaction product mixture (crude mixture not including water) |
| --- | --- | --- |
| A. S. T. M. distillation: | | |
| 5% degrees | 212.5 | 219.0 |
| 10% do | 213.3 | 221.5 |
| 20% do | 215.0 | 224.0 |
| 30% do | 216.0 | 224.5 |
| 40% do | 217.0 | 226.5 |
| 50% do | 218.0 | 229.5 |
| 60% do | 218.5 | 235.0 |
| 70% do | 219.0 | 242.0 |
| 80% do | 219.6 | |
| 90% do | 220.5 | |
| 95% do | 222.0 | |
| Specific gravity | .9538 | .9622 |
| Specific rotation | +14.40 | +11.1 |
| Per cent moisture | 0.2 | 6.2 |
| Per cent tertiary alcohol—dry basis | 86.6 | 75.4 |
| Per cent secondary alcohol—dry basis | 1.7 | 46.9 |

*Example 2*

In this example, the product obtained by the separate treatment of terpinolene with oxygen and water was utilized in the treatment of alpha-terpineol. The terpinolene product was prepared by agitating 240 grams of pure terpinolene having a boiling point of 187° C.–188° C. with 52 grams of water for 96 hours at room temperature, adding 25 grams of additional water at 24 and at 48 hours, the agitation being strong enough to whip air into the mixture. The water layer resulting was treated by vacuum distillation to remove water until an 80% concentration of water-soluble products was obtained.

A mixture consisting of 105 grams of the 80% concentration solution in water of the terpinolene-oxygen-water reaction product and 3100 grams of alpha-terpineol of 94% purity was agitated for a period of ten days with water, the agitation being conducted so as to occlude air in the mixture. At the end of this period, the mixture was permitted to separate into two layers which were separated for the recovery of the product. Water-soluble polyhydroxy terpene products were recovered by vacuum evaporation of water from the water layer at 60° C. Water-insoluble hydroxylated reaction products were recovered by vacuum fractionation of the oily layer, unreacted material coming off first.

The nature of the change brought about by the reaction is illustrated by the following data describing the materials reacted and the resulting products.

| Properties | Reaction mixture of terpineol and terpinolene cuts | Reaction product mixture (not including water) |
| --- | --- | --- |
| Specific gravity | .9464 | .9959 |
| Per cent moisture | 0.8 | 8.7 |
| Per cent tertiary alcohol—dry basis | 93.0 | 77.5 |
| Per cent secondary alcohol—dry basis | 5.3 | 53.4 |

As shown by the data, the reaction of alpha-terpineol is characterized by formation of a large content of secondary hydroxyl groups.

*Example 3*

A mixture consisting of 1340 grams of alpha-terpineol, 64 grams of terpinolene, 1500 grams of water, and traces of hydrogen sulfide was agitated vigorously while bubbling air therethrough at a velocity of 20-25 liters per hour for a period of 90 hours at a temperature of 30° C. At the end of this period, the reaction mixture was separated into a water layer and an oily layer. Water was removed from the former by vacuum evaporation at a temperature of approximately 60° C. to yield a syrupy pale yellow liquid. This water-soluble material crystallized in part upon standing for about three months.

*Example 4*

A mixture consisting of 1080 grams of alpha-pinene, 215 grams of a terpene cut rich in terpinolene derived from pine wood, and 1500 grams of water was agitated while passing a current of air therethrough at about 20 liters per hour for a period of 90 hours at a temperature of 30° C. At the end of this period, the mixture was permitted to separate into a water layer and an oily layer. A syrupy water-soluble polyhydroxy terpene compound was recovered from the water layer as in the previous example. This product crystallized in part upon standing for about three months.

*Example 5*

A mixture consisting of 1500 grams of crude wood turpentine, 100 grams of a terpinolene cut, and 2000 grams of water was agitated by shaking in an autoclave charged with air at 1500 lbs. per square inch pressure for 24 hours at a temperature of 40° C.-45° C. At the end of this period, the mixture was removed from the autoclave and permitted to separate into a water layer and an oily layer. A water-soluble polyhydroxy terpene cut was recovered from the water layer by evaporation of the water in vacuo. Polyhydroxy insoluble terpene material was recovered from the oily layer by removal of unreacted terpene hydrocarbons by vacuum distillation.

*Example 6*

A mixture consisting of 1500 grams of pine oil, 150 grams of terpinolene, 15 grams of ammonium chloride, and 1500 grams of water was agitated while air was bubbled therethrough for 90 hours at a temperature of approximately 40° C. At the end of this period, the water layer and oily layer were separated. Evaporation of the water from the water layer was accomplished by vacuum evaporation at a temperature of about 60° C. to yield a polyhydroxy water-soluble syrup which formed white crystals upon standing for two months.

*Example 7*

A mixture consisting of about 20% alpha-pinene, about 30% dipentene, about 30% alloocimene, and about 20% myrcene in a quantity of 1500 grams was mixed with 150 grams of terpinolene and agitated with 2000 grams of water having suspended therein 100 grams of activated carbon for 100 hours at a temperature of 55° C. while bubbling air through the agitated reaction mixture. At the end of the reaction, the resulting mixture was separated into a water layer and an oily layer. Vacuum evaporation of the water layer after filtration yielded a syrupy light yellow polyhydroxy water-soluble terpene product.

This application is a continuation-in-part of my application Serial No. 394,861, filed May 23, 1941, which is, in turn, a continuation-in-part of my application Serial No. 328,933, filed April 10, 1940.

It will be understood that the details and examples hereinbefore set forth are illustrative only, and that the invention as broadly described and claimed is in no way limited thereby.

What I claim and desire to protect by Letters Patent is:

1. A method for the production of oxygen-containing terpene products which comprises bringing an unsaturated terpene in liquid phase into intimate contact with water and with free oxygen, in admixture with a water-soluble polyhydroxy compound obtained by the slow reaction of terpinolene with water and free oxygen as substantially the sole sources of oxygen in the said polyhydroxy compound, maintaining said contact over a prolonged period of time until polyhydric terpene products including a freely water-soluble polyhydroxy terpene product are formed by reaction between the unsaturated terpene and the water and free oxygen as substantially the sole sources of oxygen taken up by the terpene in the reaction, and recovering a terpene product richer in oxygen than the unsaturated terpene treated.

2. A method for the production of polyhydric terpene products which comprises bringing an unsaturated terpene in liquid phase into intimate contact with water and with air, in admixture with a water-soluble polyhydroxy compound obtained by the slow reaction of terpinolene with water and free oxygen as substantially the sole sources of oxygen in the said polyhydroxy compound, maintaining said contact over a prolonged period of time until polyhydric terpene products including a freely water-soluble polyhydroxy terpene product are formed by reaction between the unsaturated terpene and the water and air as substantially the sole sources of oxygen taken up by the terpene in the reaction, and separating the resulting reaction mixture into at least a fraction containing a water-soluble product and a fraction containing a water-insoluble product.

3. A method for the production of polyhydric terpene products which comprises bringing an unsaturated terpene in liquid phase into intimate contact with water and with free oxygen, in admixture with a water-soluble polyhydroxy compound obtained by the slow reaction of terpinolene with water and free oxygen as substantially the sole sources of oxygen in the said polyhydroxy compound, maintaining said contact at temperatures between about 0° C. and about 100° C. for a period of about one-half to about twenty days until polyhydric terpene products including a freely water-soluble polyhydroxy terpene product are formed by reaction between the unsaturated terpene and the water and free oxygen as substantially the sole sources of oxygen taken up by the terpene in the reaction, and separating the resulting reaction mixture into at least a fraction containing a water-soluble product and a fraction containing a water-insoluble product.

4. A method for the production of polyhydric terpene products which comprises bringing an unsaturated terpene in liquid phase into intimate contact with water and with free oxygen under superatmospheric pressure, in admixture with a water-soluble polyhydroxy compound obtained by the slow reaction of terpinolene with water and free oxygen as substantially the sole sources of oxygen in the said polyhydroxy compound, maintaining said contact over a prolonged period of time until polyhydric terpene products including a freely water-soluble polyhydroxy terpene product are formed by reaction between the unsaturated terpene and the water and free oxygen as substantially the sole sources of oxygen taken up by the terpene in the reaction, and separating the resulting reaction mixture into at least a fraction containing a water-soluble product and a fraction containing a water-insoluble product.

5. A method for the production of oxygen-containing terpene products which comprises bringing an unsaturated terpene containing a small proportion of terpinolene in liquid phase into intimate contact with water and with free oxygen, and maintaining said contact over a prolonged period of time until polyhydric terpene products including a freely water-soluble polyhydroxy terpene product are formed by reaction between the unsaturated terpene and the water and free oxygen as substantially the sole sources of oxygen taken up by the terpene in the reaction, and recovering a terpene product richer in oxygen than the unsaturated terpene treated.

6. A method for the production of polyhydric terpene products which comprises bringing an unsaturated terpene in admixture with in excess of about 2% of its weight of terpinolene in liquid phase into intimate contact with water and with free oxygen, and maintaining said contact at temperatures between about 0° C. and about 100° C. for a period between about one-half and about twenty days until polyhydric terpene products including a freely water-soluble polyhydroxy terpene product are formed by reaction between the unsaturated terpene and the water and free oxygen as substantially the sole sources of oxygen taken up by the terpene in the reaction, the quantity of polyhydric terpene products being in excess of the amount obtainable from the terpinolene alone, and separating the resulting reaction mixture into at least a fraction containing a water-soluble product and a fraction containing a water-insoluble product.

7. A method for the production of polyhydric terpene products which comprises bringing an unsaturated terpene in admixture with in excess of about 2% of its weight of terpinolene in liquid phase into intimate contact with water and with free oxygen under superatmospheric pressure, maintaining said contact until polyhydric terpene products including a freely water-soluble polyhydroxy terpene product are formed by reaction between the unsaturated terpene and the water and free oxygen as substantially the sole sources of oxygen taken up by the terpene in the reaction, the polyhydric terpene products being formed in an amount in excess of the quantity obtainable from the terpinolene alone, and separating the resulting reaction mixture into at least a fraction containing a water-soluble product and a fraction containing a water-insoluble product.

8. A method for the production of polyhydric terpene products which comprises bringing an unsaturated water-insoluble terpene alcohol in liquid phase into intimate contact with water and with free oxygen, in admixture with a water-soluble polyhydroxy compound obtained by the slow reaction of terpinolene with water and free oxygen as substantially the sole sources of oxygen in the said polyhydroxy compound, maintaining said contact over a prolonged period of time until polyhydric terpene products including a freely water-soluble polyhydroxy terpene product are formed by reaction between the unsaturated terpene alcohol and the water and free oxygen as substantially the sole sources of oxygen taken up by the terpene alcohol in the reaction, and separating the resulting reaction mixture into at least a fraction containing a water-soluble product and a fraction containing a water-insoluble product.

9. A method for the production of polyhydric terpene products which comprises bringing an unsaturated water-insoluble terpene alcohol containing in excess of about 2% by weight of terpinolene in liquid phase into intimate contact with water and with free oxygen, maintaining said contact at temperatures between about 0° C. and about 100° C. for a period of time between one-half and about twenty days until polyhydric terpene products including a freely water-soluble polyhydroxy terpene product are formed by reaction between the unsaturated terpene alcohol and the water and free oxygen as substantially the sole sources of oxygen taken up by the terpene alcohol in the reaction, and separating the resulting reaction mixture into at least a fraction containing a water-soluble product and a fraction containing a water-insoluble product.

10. A method for the production of polyhydric terpene products which comprises bringing an unsaturated terpene hydrocarbon in liquid phase into intimate contact with water and with free oxygen, in admixture with a water-soluble polyhydroxy compound obtained by the slow reaction of terpinolene with water and free oxygen as substantially the sole sources of oxygen in the said polyhydroxy compound, maintaining said contact over a prolonged period of time until polyhydric terpene products including a freely water-soluble polyhydroxy terpene product are formed by reaction between the unsaturated terpene and the water and free oxygen as substantially the sole sources of oxygen taken up by the terpene in the reaction, and separating the resulting reaction mixture into at least a fraction containing a water-soluble product and a fraction containing a water-insoluble product.

11. A method for the production of polyhydric terpene products which comprises bringing an unsaturated terpene hydrocarbon containing in excess of about 2% by weight of terpinolene in liquid phase into intimate contact with water and with free oxygen, maintaining said contact for a period of time between one-half and about twenty days until polyhydric terpene products including a freely water-soluble polyhydroxy terpene product are formed by reaction between the unsaturated terpene hydrocarbon and the water and free oxygen as substantially the sole sources of oxygen taken up by the terpene hydrocarbon in the reaction, and separating the resulting reaction mixture into at least a fraction containing a water-soluble product and a fraction containing a water-insoluble product.

12. A method for the production of polyhydric terpene products which comprises bringing alpha-terpineol into intimate contact with water, with free oxygen, and with a water-soluble polyhydroxy compound obtained by the slow reaction of terpinolene with water and free oxygen as substantially the sole sources of oxygen in the said polyhydroxy compound, and maintaining the said contact at a temperature between about 0° C. and about 100° C. for a period of time between about one-half and about twenty days until polyhydric terpene products including a freely water-soluble polyhydroxy terpene product are formed by reaction between the terpineol and the water and free oxygen as substantially the sole sources of oxygen taken up by the terpineol in the reaction, and separating the resulting reaction mixture into at least a fraction containing a water-soluble product and a fraction containing a water-insoluble product.

13. A method for the production of polyhydric terpene products which comprises bringing pine oil into intimate contact with water, with free oxygen, and with a water-soluble polyhydroxy compound obtained by the slow reaction of terpinolene with water and free oxygen as substantially the sole sources of oxygen in the said polyhydroxy compound, and maintaining the said contact at a temperature between about 0° C. and about 100° C. for a period of time between about one-half and about twenty days until polyhydric terpene products including a freely water-soluble polyhydroxy terpene product are formed by reaction between the pine oil and the water and free oxygen as substantially the sole sources of oxygen taken up by the pine oil in the reaction, and separating the resulting reaction mixture into at least a fraction containing a water-soluble product and a fraction containing a water-insoluble product.

14. A method for the production of oxygen-containing terpene compositions which comprises bringing an unsaturated terpene in liquid phase into intimate contact with water and free oxygen, in admixture with a product obtained by the slow reaction of terpinolene with water and free oxygen as substantially the sole sources of oxygen in the said product, and maintaining said contact over a period of time until terpene compounds of increased hydroxyl content over the original terpene treated are formed by reaction of the unsaturated terpene with the free oxygen and water.

15. A method for the production of oxygen-containing compositions which comprises bringing an unsaturated terpene containing a small proportion of terpinolene in liquid phase into intimate contact with water and with free oxygen, and maintaining said contact over a period of time until terpene compounds of increased hydroxyl content over the original terpene treated are formed by reaction of the unsaturated terpene with the free oxygen and water.

DONALD A. LISTER.